United States Patent
Wu

(10) Patent No.: US 10,469,835 B2
(45) Date of Patent: Nov. 5, 2019

(54) VIRTUAL REALITY GOGGLES AND DISPLAY METHOD THEREOF

(71) Applicant: BOE TECHNOLOGY GROUP CO., LTD., Beijing (CN)

(72) Inventor: Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 9 days.

(21) Appl. No.: 15/107,862

(22) PCT Filed: Jan. 13, 2016

(86) PCT No.: PCT/CN2016/070784
§ 371 (c)(1),
(2) Date: Jun. 23, 2016

(87) PCT Pub. No.: WO2017/020557
PCT Pub. Date: Feb. 9, 2017

(65) Prior Publication Data
US 2017/0214905 A1 Jul. 27, 2017

(30) Foreign Application Priority Data
Aug. 3, 2015 (CN) .......................... 2015 1 0483380

(51) Int. Cl.
*H04N 13/344* (2018.01)
*G02B 27/22* (2018.01)
(Continued)

(52) U.S. Cl.
CPC ....... *H04N 13/344* (2018.05); *G02B 27/0172* (2013.01); *G02B 27/0176* (2013.01);
(Continued)

(58) Field of Classification Search
CPC .. H04N 13/044; H04N 13/344; H04N 13/341; H04N 13/139; G02B 27/2264;
(Continued)

(56) References Cited

U.S. PATENT DOCUMENTS 6,177,966 B1* 1/2001 Masuda ............. G02B 27/0172
345/7
8,970,682 B2* 3/2015 Kim ..................... H04N 13/341
348/56
(Continued)

FOREIGN PATENT DOCUMENTS

CN 102104787 A 6/2011
CN 102340636 A 2/2012
(Continued)

OTHER PUBLICATIONS

Office Action in Chinese Application No. 201510483380.3 dated Aug. 24, 2017, with English translation.
(Continued)

*Primary Examiner* — Maria E Vazquez Colon
(74) *Attorney, Agent, or Firm* — Womble Bond Dickinson (US) LLP

(57) ABSTRACT

The present invention relates to the field of display technology, and discloses virtual reality goggles and a display method thereof. The virtual reality goggles comprise: a shell, a display screen and an optical lens, wherein the display screen and the optical lens are located within the shell, a buffer layer is formed on a side of the shell facing towards viewing eyes, the optical lens is located between the buffer layer and the display screen, for projecting a picture of the whole display screen only to the left eye or the right eye at a time. The virtual reality goggles of the present invention, by controlling the optical lens to project the picture of the whole display screen only to one eye at a time, enables a single eye to see the picture of the whole display screen. And compared to the conventional goggles through which a single eye can only see half of the picture of the display screen, the picture resolution of the goggles of the present invention is doubled.

9 Claims, 3 Drawing Sheets

(51) Int. Cl.
*H04N 13/341* (2018.01)
*H04N 13/139* (2018.01)
*G02F 1/1335* (2006.01)
*G02F 1/137* (2006.01)
*G02F 1/29* (2006.01)
*G02B 27/01* (2006.01)
*G09G 3/3208* (2016.01)
*G09G 3/36* (2006.01)

(52) U.S. Cl.
CPC ......... *G02B 27/22* (2013.01); *G02B 27/2242* (2013.01); *G02B 27/2264* (2013.01); *G02F 1/137* (2013.01); *G02F 1/133526* (2013.01); *G02F 1/29* (2013.01); *H04N 13/139* (2018.05); *H04N 13/341* (2018.05); *G02B 2027/0134* (2013.01); *G02B 2027/0136* (2013.01); *G09G 3/3208* (2013.01); *G09G 3/36* (2013.01); *G09G 2340/0407* (2013.01); *G09G 2340/0442* (2013.01)

(58) Field of Classification Search
CPC ............ G02B 27/0172; G02B 27/0176; G02B 27/22; G02B 27/2242; G02B 2027/0134; G02B 2027/0136; G02F 1/133526; G02F 1/137; G02F 1/29; G09G 3/3208; G09G 3/36; G09G 2340/0407; G09G 2340/0442
See application file for complete search history.

(56) References Cited

U.S. PATENT DOCUMENTS

2001/0038358 A1* 11/2001 Tserkovnyuk ....... H04N 13/398
                                                            345/5
2002/0118452 A1  8/2002 Taniguchi et al.
2010/0079676 A1  4/2010 Kritt et al.
2010/0254017 A1  10/2010 Martins
2013/0271503 A1  10/2013 Odake et al.
2016/0261300 A1* 9/2016 Fei .......................... H04W 4/70
2016/0353098 A1* 12/2016 Stein .................. G02B 27/2264

FOREIGN PATENT DOCUMENTS

| | | | |
|---|---|---|---|
| CN | 102360136 A | | 2/2012 |
| CN | 202149976 U | | 2/2012 |
| CN | 202171708 U | | 3/2012 |
| CN | 102483521 A | | 5/2012 |
| CN | 102651819 A | | 8/2012 |
| CN | 202677021 U | | 1/2013 |
| CN | 103235441 A | | 8/2013 |
| CN | 103246075 A | | 8/2013 |
| CN | 203480184 U | * | 3/2014 |
| CN | 203480184 U | | 3/2014 |
| CN | 203786396 U | | 8/2014 |
| CN | 104714305 A | | 6/2015 |
| CN | 104749761 A | | 7/2015 |
| CN | 104765152 A | | 7/2015 |
| CN | 105093532 A | | 11/2015 |
| TW | 201248192 A | | 12/2012 |

OTHER PUBLICATIONS

Office Action in Chinese Application No. 201510483380.3 dated Jan. 17, 2017, with English translation. 8 pages.
Office Action in Chinese Application No. 201510483380.3 dated May 22, 2017, with English translation.
International Search Report and Written Opinion in PCT/CN2016/070784 with English translation. 16 pages.
"Decision on Rejection," CN Application No. 201510483380.3 (dated Feb. 8, 2018).

* cited by examiner

VIRTUAL REALITY GOGGLES AND DISPLAY METHOD THEREOF

FIELD OF THE INVENTION

The present invention relates to the field of display technology, particularly to virtual reality goggles and a display method thereof.

BACKGROUND OF THE INVENTION

Virtual reality has attracted progressively more attention, and many related products such as Google Glasses of Google and Hololens newly introduced by Microsoft have come up in the market. Such devices for displaying before human eyes bring us may brand new experiences. There are various virtual reality technologies, one of which is immersive virtual reality goggles. The principle of the immersive virtual reality goggles of current manufacturers is mostly as shown in FIG. 1, which goggles comprise: a first display screen 121, a second display screen 122 (or it may be a large piece of display screen divided into two display areas), a near-eye first lens 131 and second lens 132, the lenses projecting the contents of the corresponding portions on the display panel to the human eyes respectively. They further comprise a shell 110 for fixing and protecting the first display screen 121, the second display screen 122, the first lens 131 and the second lens 132. A buffer layer 140 is arranged at a portion of the shell 110 which is in contact with the human face, the buffer layer 140 being used for fitting closely with the human face so as to avoid ambient light to enter and also improve wearing comfort. The buffer layer 140 can be made of cotton, sponge, coat, resin and the like. Other components such as a control circuit, an interface, a power supply are not shown.

However, by using the above immersive virtual reality goggles, each eye can only see a small piece of display screen in front of the eye, or can only see half of the large piece of screen divided for use. Therefore the picture resolution is relatively low.

SUMMARY OF THE INVENTION

The present invention provides the following solutions to increase picture resolution of the virtual reality goggles.

In an aspect, the present

In order to solve the above technical problem, the present invention provides virtual reality goggles, comprising: a shell, a display screen and an optical lens, wherein the display screen and the optical lens are located within the shell, a buffer layer is formed on a side of the shell facing the viewing human eyes, the optical lens is located between the buffer layer and the display screen, for projecting a picture of the whole display screen only to the left eye or the right eye at the same moment.

Optionally, the goggles further comprise a first light valve and a second light valve for blocking the left eye and the right eye respectively so as to prevent the light from entering.

Optionally, the first light valve and the second light valve are located within the buffer layer.

Optionally, the first light valve and the second light valve both have a structure similar to a liquid crystal display panel.

Optionally, the optical lens is a liquid crystal lens having a structure similar to a liquid crystal display panel.

Optionally, the display screen is an OLED display screen.

Optionally, the display screen is a liquid crystal display screen.

The present invention further provides a display method for virtual reality goggles as stated above, which performs the following two steps for each frame of picture until all frames of pictures are displayed:

at a first moment, processing each frame of picture as having a resolution conforming to the resolution of the display screen of the virtual reality goggles, and then displaying it in the whole display screen of the virtual reality goggles, and controlling the optical lens to project the picture of the whole display screen only to one eye, and making an aspect ratio of a display picture seen by the human eyes to be reduced to half of an aspect ratio of the display screen;

at a second moment, controlling the optical lens to project the picture of the whole display screen only to the other eye, and making the aspect ratio of the display picture seen by the eye to be reduced to half of the aspect ratio of the display screen.

Optionally, at a first moment for displaying a next frame of picture, the optical lens keeps projecting the picture of the whole display screen to the eye which is projected at a second moment for the previous frame. This can reduce the switching frequency of the optical lens.

Optionally, the virtual reality goggles further comprise a first light valve and a second light valve for blocking the left eye and the right eye respectively so as to prevent light from entering, at each moment the light valve to which the unprojected eye corresponds being closed and the light valve to which the projected eye corresponds being opened. This can eliminate influence of light leakage and enhance the viewing effect.

The virtual reality goggles of the present invention, by controlling the optical lens to project the picture of the whole display screen only to one eye at a moment, enable a single eye to see the picture of the whole display screen. Thus, compared to the conventional virtual reality goggles through which a single eye can only see half of the picture of the display screen, the picture resolution of the virtual reality goggles of the present invention is doubled.

BRIEF DESCRIPTION OF THE DRAWINGS

The following drawings are only used for schematically illustrating the purposes, structures, characteristics and advantages of the present invention, rather than being intended to limit the scope of the present invention. The elements in the drawings may be not drawn to scale, and on the contrary, for the purpose of clarity, some of the elements might be shown exaggeratedly.

DETAILED DESCRIPTION OF THE INVENTION

The specific implementations of the present invention will be described below in more detail with reference to the drawings and the embodiments. The following embodiments are used for illustrating the present invention rather than limiting the scope of the present invention.

Figure 1:
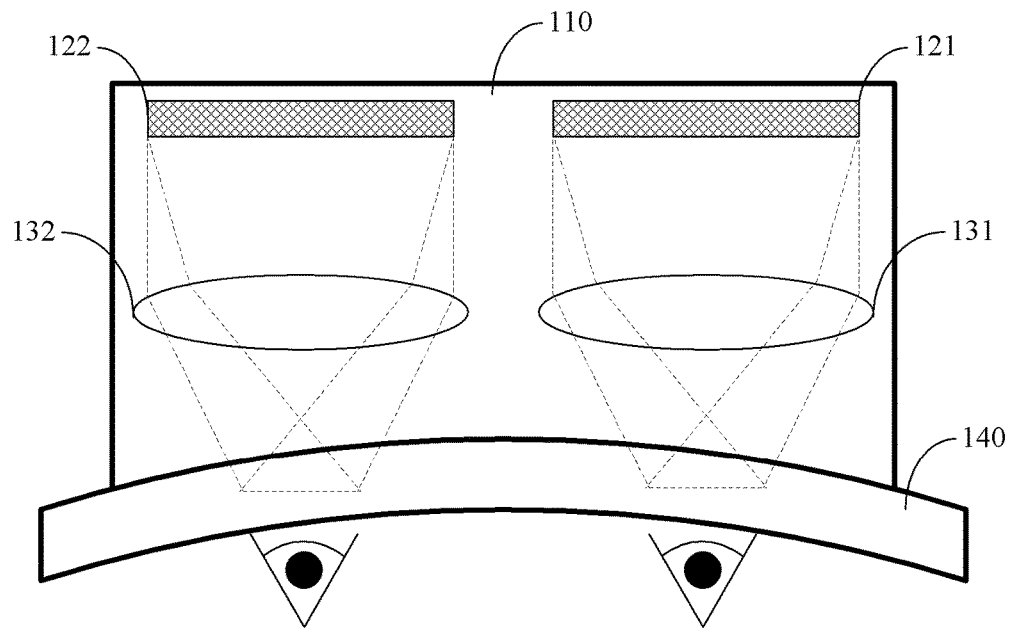
FIG. 1 is a schematic view of a structure and a display principle of virtual reality goggles in the prior art.
Figure 2:
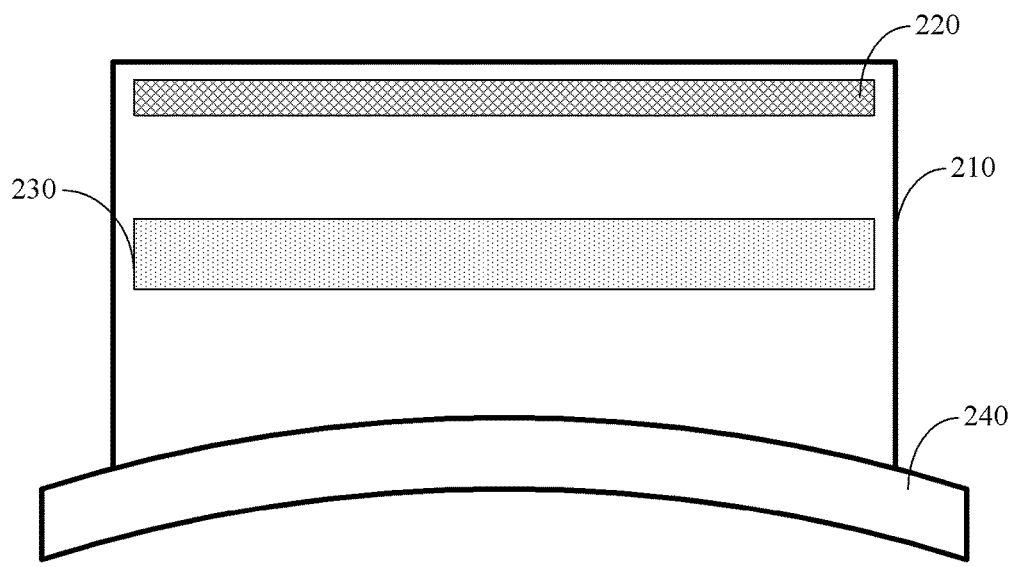
FIG. 2 is a structural schematic view of virtual reality goggles according to an embodiment of the present invention.

Virtual reality goggles according to an embodiment of the present invention, as shown in FIG. 2, comprise: a shell 210, a display screen 220 and an optical lens 230, the display screen 220 and the optical lens 230 being located within the shell 210. A buffer layer 240 is formed at a side of the shell 210 facing the viewing human eyes, and the optical lens 230 is located between the buffer layer 240 and the display screen 220, for projecting a whole picture of the display screen 220 only to the left eye or the right eye at a time, so as to enable a single eye to see the picture of the whole display screen 220. Compared to the convention virtual reality goggles through which only half of the picture of the display screen 220 can be seen simultaneously, the picture resolution experienced by the user in the virtual reality goggles of the present invention is doubled.

In this embodiment, the optical lens 230 is specifically a liquid crystal lens having a structure similar to a liquid crystal display panel, i.e., a structure similar to a liquid crystal cell of a display panel. Therefore, emission of light can be controlled by controlling deflection of the liquid crystal, thereby enabling the light emitted by the display screen to be incident only to a single eye, i.e., the display picture is only seen by a single eye.

Figure 3:
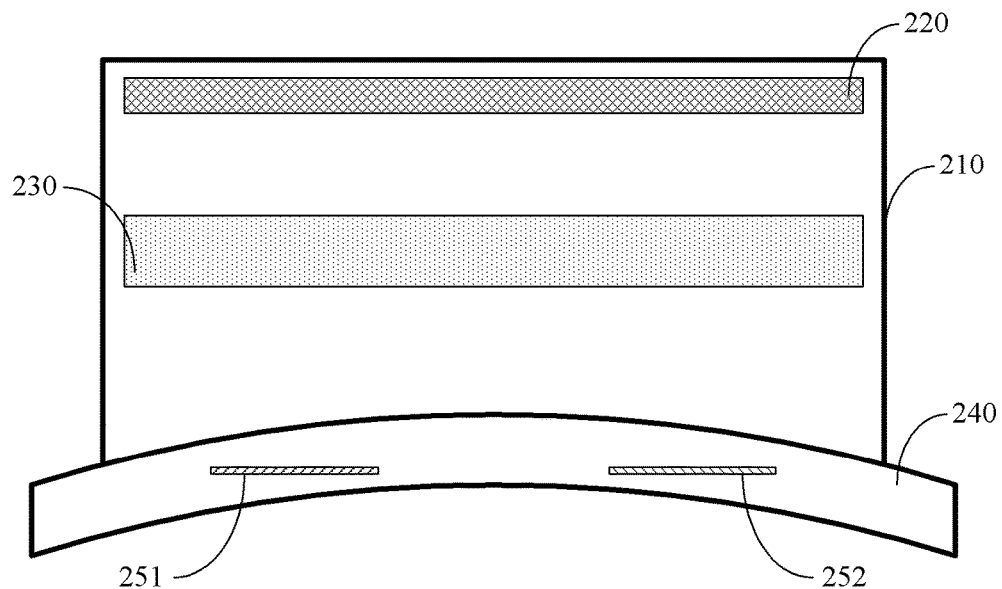
FIG. 3 is a structural schematic view of another virtual reality goggles according to an embodiment of the present invention.
Figure 4:
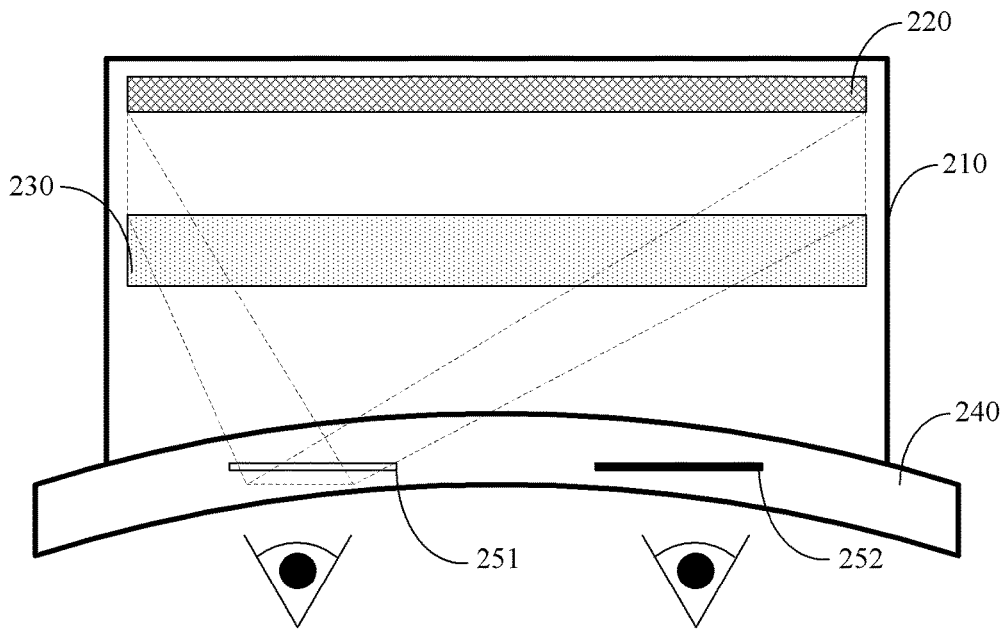
FIG. 4 is a schematic view when light from a display screen of the virtual reality goggles in FIG. 3 is incident onto the left eye.
Figure 5:
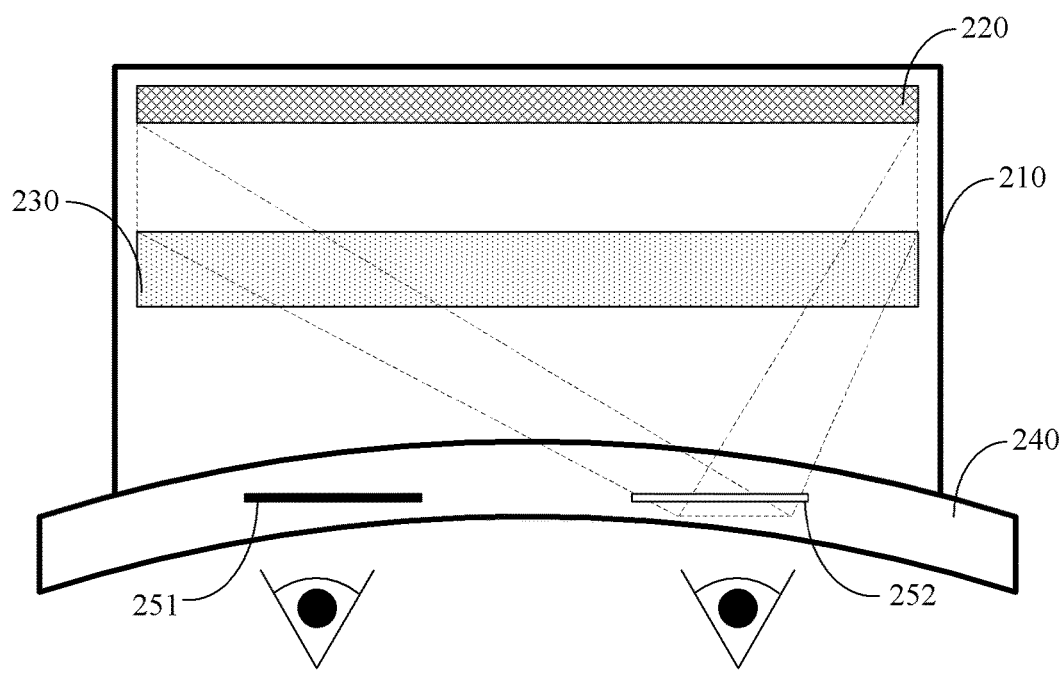
FIG. 5 is a schematic view when a display picture of the virtual reality goggles in FIG. 3 is projected onto the right eye.

Virtual reality goggles according to another embodiment of the present invention are as shown in FIG. 3. The inventor found in carrying out the present invention that the optical lens 230 may have the situation of light leakage, i.e., when projecting the display picture to the left eye, the right eye may see leaked light. This influences the viewing effect of the virtual reality goggles of the present invention. Therefore, the virtual reality goggles as shown in FIG. 3, on the basis of FIG. 2, further comprise a first light valve 251 and a second light valve 252 for blocking the left eye and the right eye respectively so as to prevent the light from entering.

The closer to the human eyes the above light valves are, the better the effect of preventing the leaked light from entering the human eyes will be. Hence, the first light valve 251 and the second light valve 252 are preferably located within the buffer layer 240.

In this embodiment, the first light valve 251 and the second light valve 252 both have a structure similar to a liquid crystal display panel, wherein the light valves are opened by controlling deflection of the liquid crystal so as to control the light to totally pass through, and the light valves are closed by controlling deflection of the liquid crystal so as to control the light not to pass through at all.

Optionally, the display screen 220 in the virtual reality goggles is an OLED display screen or a liquid crystal display screen.

The present invention further provides a display method for virtual reality goggles as stated in any of the above embodiments, wherein the following two steps are performed for each frame of picture until all frames of pictures are displayed:

at a first moment, processing each frame of picture as having a resolution conforming to a resolution of the display screen 220 of the virtual reality goggles, and then displaying it in the whole display screen 220 of the virtual reality goggles, and controlling the optical lens 230 to project the picture of the whole display screen only to one eye, and making an aspect ratio of a display picture seen by the human eye to be reduced to half of an aspect ratio of the display screen 220;

at a second moment, controlling the optical lens 230 to project the picture displayed by the whole display screen only to the other eye, and making the aspect ratio of the display picture seen by the human eye to be reduced to half of the aspect ratio of the display screen 220.

Assume that the resolution size of the corresponding display screen of the virtual reality goggles in the prior art for providing contents to each eye is A×B (i.e., there are two display screens for the left eye and the right eye respectively), the resolution size of an image provided for a single eye is AX×BX, wherein X is the magnification. Meanwhile, in order to ensure that the viewer obtains a same visual field as the existing product (i.e., obtaining a visual field of AX×BX), in the present invention, because the size of the display screen therein is 2A×B, it is required to adjust the resolution of the image to be displayed as a image of 2A×B and double the resolution in the horizontal direction, and then input it into the display screen of a resolution of 2A×B. That is, compared to an image for use in the goggles in the prior art, the resolution of the display image for use in the goggles of the present invention in the horizontal direction will be doubled while the image is extended by one time in the horizontal direction. And then, the image is projected to one eye of the viewer by using the optical lens, meanwhile, the width of the image in the horizontal direction is narrowed by half by using the optical lens (which can be realized by controlling deflection of the liquid crystal in the liquid crystal lens), i.e., making the aspect ratio thereof to be reduced by half, thereby forming an image of AX×BX, thus the resolution of the image seen by the viewer in the horizontal direction will be doubled.

The advantages of the virtual reality goggles of the present invention will be set forth specifically by taking viewing movie pictures as an example. Assume that the virtual reality goggles in the prior art divide the single display screen into two display areas for providing pictures for each eye respectively, the resolution of each display area is a×b (e.g. 1000×1000). It is further assumed that the resolution of the image for displaying can reach 2a×b (e.g. 2000×1000, i.e., the aspect ratio of the image is 2:1), thus in displaying, in order to maintain the aspect ratio of the image, the virtual reality goggles in the prior art must compress the resolution of the image to be displayed as a×b/2 (e.g. 1000×500) so as to be displayed in the two display areas respectively. Therefore, in the virtual reality goggles in the prior art, the user can only experience movie pictures of a×b/2 (e.g. 1000×500) resolution. However, for the virtual reality goggles of the present invention, since it can project a picture of the whole display screen to a single eye, it can play a display picture of 2a×b (e.g. 2000×1000) resolution in the display screen directly, and the user can experience displaying of 2a×b (e.g. 2000×1000) resolution in the same visual field. Thus it can be seen that in the process of viewing the movie video, the user can experience displaying of double resolution by using the virtual reality goggles of the present invention.

In order to reduce the switching frequency of the optical lens, further, at a first moment for displaying a next frame of picture, the optical lens keeps projecting the picture of the display screen to the eye which is projected at a second moment of a previous frame.

For the virtual reality goggles having light valves, at each moment, a light valve to which the unprojected eye corresponds is closed and a light valve to which the projected eye corresponds is opened. This can eliminate influence of light leakage of the optical lens and enhance the viewing effect.

The above implementations are only used for illustrating the present invention, rather than limiting the present invention. The ordinary skilled person in the related technical field may also make various modifications and variations without departing from the spirit and the scope of the present invention. Hence, all the equivalent technical solutions also belong to the scope of the present invention, and the patent protection scope of the present invention should be defined by the claims. It should be noted that the wording "comprise" does not exclude presence of elements or steps not listed in the claims. The wording "a" or "an" preceding an element does not exclude presence of a plurality of such elements. The mere fact that some measures are stated in mutually different dependent claims does not indicate that the combination of these measures cannot be used to advantage. Any reference signs in the claims should not be construed as limitation of the scopes.

The invention claimed is:

1. A display method for virtual reality goggles, the virtual reality goggles comprising a shell, a display screen and an optical lens, the display screen and the optical lens being located within the shell, the shell being provided with a buffer layer formed on a side of the shell for facing viewing human eyes, the optical lens being located between the buffer layer and the display screen for projecting a whole region of the display screen to only one of a left eye and a right eye of the viewing human eyes at a time, the method comprising:

for each frame of pictures to be displayed:
at a first moment, processing the frame as having a resolution conforming to a resolution of the display screen, displaying the processed frame across the whole region of the display screen, and controlling the optical lens to project the whole region of the display screen to only one of the left and right eyes, wherein the optical lens is controlled to project the frame displayed across the whole region of the display screen to have an aspect ratio reduced to half of an aspect ratio of the display screen;
at a second moment, controlling the optical lens to project the whole region of the display screen to the other one of the left and right eyes, wherein the optical lens is controlled to project the frame displayed across the whole region of the display screen to have an aspect ratio reduced to half of the aspect ratio of the display screen.

2. The display method for virtual reality goggles as claimed in claim 1, further comprising at the first moment for displaying a next frame of the pictures, controlling the optical lens to keep projecting the whole region of the display screen to the eye which is projected at the second moment for a previous frame.

3. The display method for virtual reality goggles as claimed in claim 1, wherein the virtual reality goggles further comprise a first light valve and a second light valve for blocking the left eye and the right eye respectively so as to prevent light from entering, and wherein the method further comprises at each moment, closing one of the first and second light valves to which a blocked eye corresponds and opening the other one of the first and second light valves to which an unblocked eye corresponds.

4. The display method for virtual reality goggles as claimed in claim 2, wherein the virtual reality goggles further comprise a first light valve and a second light valve for blocking the left eye and the right eye respectively so as to prevent light from entering, and wherein the method further comprises at each moment, closing one of the first and second light valves to which a blocked eye corresponds and opening the other one of the first and second light valves to which an unblocked eye corresponds.

5. Goggles comprising:
a shell provided with a buffer layer formed on a side of the shell for facing viewing human eyes;
a display screen configured to display each of frames having a resolution conforming to a resolution of the display screen across a whole region of the display screen; and
an optical lens located between the buffer layer and the display screen for projecting the whole region of the display screen to only one of a left eye and a right eye of the viewing human eyes at a time,
wherein the display screen and the optical lens are located within the shell, and
wherein the optical lens is configured to, for each frame of pictures to be displayed:
project the whole region of the display screen to only one of the left and right eyes at a first moment, wherein the optical lens is controlled to project the frame displayed across the whole region of the display screen to have an aspect ratio reduced to half of an aspect ratio of the display screen, and
project the whole region of the display screen to the other one of the left and right eyes at a second moment, wherein the optical lens is controlled to project the frame displayed across the whole region of the display screen to have an aspect ratio reduced to half of the aspect ratio of the display screen.

6. The goggles as claimed in claim 5, wherein the optical lens is further configured to, at the first moment for displaying a next frame of the pictures, keep projecting the whole region of the display screen to the eye which is projected at the second moment for a previous frame.

7. The goggles as claimed in claim 5, further comprising a first light valve and a second light valve for blocking the left eye and the right eye respectively so as to prevent light from entering, wherein the first and second light valves are configured such that at each moment, one of the first and second light valves to which a blocked eye corresponds is closed and the other one of the first and second light valves to which an unblocked eye corresponds is opened.

8. The display method for virtual reality goggles as claimed in claim 1, wherein the optical lens comprises a liquid crystal lens.

9. The goggles as claimed in claim 5, wherein the optical lens comprises a liquid crystal lens.

* * * * *